United States Patent Office 3,630,993
Patented Dec. 28, 1971

3,630,993
SYNERGISTIC ORGANOTIN STABILIZER COMPOSITIONS AND RESINS STABILIZED THEREWITH
Christian H. Stapfer, Newtown, Pa., assignor to Cincinnati Milacron Chemicals, Inc., Reading, Ohio
No Drawing. Filed Dec. 3, 1968, Ser. No. 780,888
Int. Cl. C08f 45/62
U.S. Cl. 260—45.75 K                           4 Claims

ABSTRACT OF THE DISCLOSURE

An improved stabilizer composition comprises a synergistic combination of an organic thioanhydride and a monohydrocarbyl tin compound of the formula $$R^3Sn(Z)_n(Z^1R^4)_{3-2n}$$

wherein $R^3$ is a hydrocarbyl radical having 1 to 12 carbon atoms, Z and $Z^1$ are either oxygen or sulfur, $R^4$ is hydrogen or an organic radical bonded to $Z^1$ by a carbon atom and $n$ is a number from 0 to $1\frac{1}{2}$ varying in increments of $\frac{1}{2}$.

Halide containing resins stabilized with these compositions exhibit improved resistance to the development of early color during processing.

---

This invention relates to organotin stabilizers and halide containing resins stabilized therewith. More particularly, the invention relates to a synergistic combination of organic thioanhydrides with monohydrocarbyl tin compounds which reduces the development of early color during processing when incorporated as a stabilizer in halogen containing resins.

During recent years the use of thioanhydrides corresponding to the formula

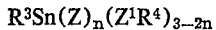

wherein $R^1$ and $R^2$ are independently selected hydrocarbon groups with 6 to 20 carbon atoms, have been contemplated as stabilizers against the thermal decomposition of halogen containing resins, and particularly polyvinyl chloride. These thioanhydrides are desirable because they exhibit good long term stabilizing efficacy for both plastisized and rigid formations, but they have never gained commercial importance because of the substantial discoloration of polymers which occurs during processing. This discoloration is unrelated to the stabilizing properties of the thioanhydrides, however, it severely restricts the commercial use because of the serious detraction from the esthetic appeal of products.

I have discovered that organic thioanhydrides containing small amounts of monohydrocarbyl tin compounds corresponding to the formula $R^3Sn(Z)_n(Z^1R^4)_{3-2n}$ wherein $R^3$ is a hydrocarbyl group containing 1 to 12 carbon atoms, Z and $Z^1$ are independently selected from oxygen and sulfur, $R^4$ is hydrogen or an organic radical bonded to Z by a carbon atom and $n$ is a number from 0 to $1\frac{1}{2}$ varying in increments of $\frac{1}{2}$ overcome the disadvantages of the prior art.

Suitable thioanhydrides for practicing the present invention include those where $R^1$ and $R^2$ are the same or different alkyl or aryl radicals. The alkyl radicals may be straight chain radicals producing anhydrides such as thiolauric or thiostearic anhydride; branched chain radicals producing anhydrides such as 1-thio-2-ethylhexoic anhydride and unsaturated alkyl radicals such as those producing thio crotonic anhydride. The aryl radicals suitable for practicing the present invention include unsubstituted aryl producing anhydrides such as thiobenzoic anhydride or alkyl substituted aryl radicals producing thioanhydrides such as 2-tert.butylthiobenzoic anhydride. An example of suitable thioanhydrides which have different $R^1$ and $R^2$ groups is thiolauricbenzoic anhydride.

The monohydrocarbyl tin compounds suitable for arresting the development of early color on halogen containing resins stabilized with organic thioanhydrides include stannoic oxides, stannoic sulfides, stannoic acids and thiostannoic acids having one hydrocarbyl group attached to the tin atom. The hydrocarbyl group preferably contains 1 to 12 carbon atoms and may be an alkyl, aryl, alkaryl or aralkyl radical. Examples of this group of compounds include methylstannoic acid, methylthiostannoic acid, butyl stannoic acid, butyl thiostannoic acid, butyl tin sulfide, butyl tin oxide, n-octyl stannoic acid, isooctyl stannoic acid, n-octyl thiostannoic acid, isooctyl thiostannoic acid and phenyl stannoic acid. These compounds frequently exist in the form of polymers which are condensation products of the above stannoic and thiostannoic acids as well as mixtures of stannoic and thiostannoic acids. The condensation products may contain 2 to 1000 repeat units and generally contain 2 to 100 repeat units corresponding to the formula $(R^3S_nZ_n)_y$ wherein Z is oxygen, sulfur or a mixture of oxygen and sulfur, $n$ equals 1.5 and $y$ denotes the degree of polymerization.

Monohydrocarbyl tin compounds suitable for practicing the present invention include compounds where $R^4$ is a hydrocarbon radical, preferably alkyl, having 1 to 12 carbon atoms. Some examples of suitable compounds include the methyl, butyl, n-octyl and isooctyl esters of both monohydrocarbyl stannoic and thiostannoic acids such as the isooctyl ester of butylstannoic acid and the butyl ester of butylthiostannoic acid.

The monohydrocarbyl tin compounds can also have a functional group attached to $Z^1$ by a carbon atom and are useful in practicing the present invention. Functional groups of this type include

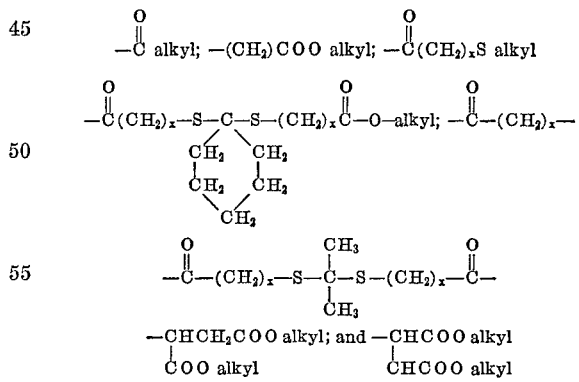

wherein $x$ is 1 to 3. Some examples of monohydrocarbyl tin compounds containing these groups are monobutyl tin tris (isooctyl mercapto propionate), monobutyl tin tris (isooctyl-3-mercapto butyrate) and monobutyl tin tris [cyclohexylidene bis (thio propionic acid) monobutyl ester]. Some examples of monohydrocarbyl compounds having Z and $Z^1$ unalike are bis(monobutyl tin diisooctylmercapto propionate) oxide and poly[butyl stannoxy cyclohexylidene bis(thiopropionate)].

The monohydrocarbyl tin compounds are generally used in amounts varying from 1 to 25 weight percent of the thioanhydride in stabilizers of the present invention and preferably in amounts of 4 to 12 weight percent. The synergistic stabilizers of the present invention are generally incorporated into a resin in amounts of 0.1 to 10 weight percent and preferably from 0.5 to 5 weight percent.

The synergistic action of the monohydrocarbyl tin compounds of the present invention is demonstrated to be unexpected in view of the poor results obtained when di- and trialkyl tin compounds are combined with organic thioanhydride stabilizers.

Resins which may be stabilized by the synergistic composition of the present invention include both rigid and plastisized formulations of halogen containing polymers particularly polyvinyl chloride and vinylidene chloride, copolymers of halogen containing resins with ethylenically unsaturated compounds such as, copolymers of vinyl acetate and vinyl chloride and the like.

The following examples are presented to demonstrate several embodiments of the present invention and are not to be considered as limitations thereon.

EXAMPLE 1

Six formulations were prepared. Each formulation contained 100 parts GEON 103P (a general purpose polyvinyl chloride resin suspension manufactured by the B. F. Goodrich Company), 0.5 parts of stearic acid and a total of 2 parts of the stabilizer as indicated in Table I. Each formulation was processed on a two roll mill at 370° F. for five minutes and then divided into a number of 1" x ½" x ⅛" samples, the samples of each formulation were then placed in an air circulatory oven at 370° and a sample of each formulation was removed from the oven at 10 minute intervals over an interval of one hour. Formulations 1,3 and 5 were tested for comparative purposes and do not represent embodiments of the present invention. Table I reports the composition of the stabilizers tested with slight discoloration representing the time for some yellowing of the test sample to occur and moderate discoloration representing the time for an orange or red discoloration to occur.

TABLE I

| | | Time in minutes to— | | |
|---|---|---|---|---|
| No. | Stabilizer composition in parts of formulation (p.) | Very slight discoloration | Moderate discoloration | Thermal decomposition |
| 1 | 2.p. thiolauric anhydride | (¹) | 10 | 20 |
| 2 | {1.9 p. thiolauric anhydride / 0.1 p. butylstannoic acid} | 20 | | 30 |
| 3 | 2 p. thiostearic anhydride | (¹) | 0 | 10 |
| 4 | {1.9 p. thiostearic anhydride / 0.1 p. butylstannoic acid} | 20 | | 30 |
| 5 | 2 p. thiobenzoic anhydride | (¹) | 10 | 20 |
| 6 | {1.9 p. thiobenzoic anhydride / 0.1 p. butylstannoic acid} | 20 | | 30 |

¹ Yellowing began during milling.

In all three of the above formulations containing only the thioanhydride, early color developed during the milling operation, while the three formulations containing the synergistic combinations of the present invention exhibited no early color and began to show signs of degradation only after 20 minutes of exposure.

EXAMPLE 2

Six formulations, each containing 100 parts of PVC 40 (a general purpose polyvinyl chloride resin manufactured by the Diamond-Shamrock Corp.), 25 parts dioctylphthalate, 5 parts epoxidized soy bean oil, 0.25 parts stearic acid and 2 parts of the respective stabilizers as indicated in Table II, were milled, divided and exposed according to the procedure described in Example I. The results of the tests are reported in Table II. Formulation 1 does not represent an embodiment of the present invention and is included only for comparative purposes and formulations 2–6 clearly demonstrate the improved results obtained using the stabilizers of the present invention.

TABLE II

| | | Time in minutes to— | | |
|---|---|---|---|---|
| No. | Stabilizer composition in parts of formulation (p.) | Very slight discoloration | Moderate discoloration | Substantial discoloration |
| 1 | 2 p. thiolauric anhydride | 10 | 20 | 40 |
| 2 | {1.9 p. thiolauric anhydride / 0.1 p. Monobutyltin tris [cyclohexylidene bis (thiopropionic acid) monobutyl ester]} | 50 | 60 | |
| 3 | {1.9 thiolauric anhydride / 0.1 p. Poly[butyl stannoxy cyclohexylidene bis (thiopropionate)]} | 50 | 60 | |
| 4 | {1.9 p. thiolauric anhydride / 0.1 p. butyl stannoic acid} | 50 | 60 | |
| 5 | {1.9 p. thiolauric anhydride / 0.1 p. monobutyl tin sulfide} | 50 | 60 | |
| 6 | {1.9 p. thiolauric anhydride / 0.1 p. monobutyl tin tris (isooctylmercapto propionate)} | 40 | 60 | |

EXAMPLE 3

Eight formulations were prepared as described in Example 2 except for the respective stabilizers as indicated in Table III and the formulations were processed in the same manner described in Example 1 except oven exposure was extended thirty minutes. The following table reports the results of the test with formulations 1 and 5 not being embodiments of the present invention and included for comparative purposes only.

TABLE III

| | | Time in minutes to— | | |
|---|---|---|---|---|
| No. | Stabilizer composition in parts (p.) | Very slight discoloration | Moderate discoloration | Thermal degradation |
| 1 | 2 p. thiostearic anhydride | (¹) | (²) | 10 |
| 2 | {1.9 p. thiostearic anhydride / 0.1 p. butylstannoic acid} | 10 | 30 | 90 |
| 3 | {1.9 p. thiostearic anhydride / 0.1 p. methyl stannoic acid} | 10 | 90 | |
| 4 | {1.9 p. thiostearic anhydride / 0.1 p. phenylstannoic acid} | 10 | 60 | 80 |
| 5 | 2 p. thiobenzoic anhydride | | 10 | 90 |
| 6 | {1.9 p. thiobenzoic anhydride / 0.1 p. butylstannoic acid} | 10 | 60 | |
| 7 | {1.9 p. thiobenzoic anhydride / 0.1 p. methyl stannoic acid} | 10 | 50 | |
| 8 | {1.9 p. thiobenzoic anhydride / 0.1 p. phenylstannoic acid} | 20 | 80 | 90 |

¹ Slight yellowing developed during milling.
² Very strong discoloration after 10 minutes, decomposition at 80 minutes.

EXAMPLE 4

Three formulations were prepared containing 100 parts of PVC 40 (a general purpose polyvinyl chloride resin manufactured by the Diamond-Shamrock Corp.), 25 parts dioctylphthalate, 5 parts epoxidized soy bean oil, 0.25 parts stearic acid and 2 parts of the respective stabilizers listed in Table II were milled, divided and exposed according to the procedure described in Example 1 except that the oven exposure was conducted for 90 minutes. The results of this test are reported in Table IV with formulation 2 being according to the present invention and formulations 1 and 3 not being embodiments of the present invention and included for comparative purposes to demonstrate the synergistic effect of the stabilizers of the present invention.

TABLE IV

| No. | Stabilizer composition in parts (p.) | Time in minutes to— | | |
|---|---|---|---|---|
| | | Very slight discoloration | Moderate discoloration | Thermal degradation |
| 1 | 2 p. thiolauric anhydride | 10 | 20 | 90 |
| 2 | (1.9 p. thiolauric anhydride / 0.1 p. butylstannoic acid) | | 50 | |
| 3 | 0.1 p. butylstannoic acid | (¹) | 10 | 50 |

¹ Slight yellowing began during milling.

EXAMPLE 5

Six formulations more rigid than those of Examples 1–4 were prepared by mixing 100 parts of Opalan 630 (a suspension of polyvinyl chloride manufactured by Monsanto Corporation), 10 parts dioctylphthalate, 5 parts epoxidized soy bean oil and 0.2 parts of stearic acid and 2.0 parts of the stabilizer as indicated in Table 5 was processed according to the procedure described in Example 1. Table V reports the results of this test. Formulation 1 is not an embodiment of the present invention and is included for comparative purposes only.

TABLE V

| No. | Stabilizer composition in parts (p.) | Time in minutes to slight discoloration |
|---|---|---|
| 1 | 2 p. thiolauric anhydride | (¹) |
| 2 | {1.9 p. thiolauric anhydride / 0.1 p. monobutyltin tris [cyclohexylidene bis (thiopropionic acid) monobutyl ester]} | 30 |
| 3 | {1.9 p. thiolauric anhydride / 0.1 p. poly[butyl stannoxy cyclohexlidene bis (thiopropionate)]} | 30 |
| 4 | {1.9 p. thiolauric anhydride / 0.1 p. butyl stannoic acid} | 30 |
| 5 | {1.9 p. thiolauric anhydride / 0.1 p. monobutyltin sulfide} | 20 |
| 6 | {1.9 p. thiolauric anhydride / 0.1 p. mono butyltin tris (isooctylmercapto propionate)} | 20 |

¹ Developed during milling.

The formulation stabilized with thiolauric anhydride alone developed early color during the milling operation and had a distinct yellow color after 20 minutes of oven exposure while all formulations containing stabilizers of the present invention did not develop early discoloration until 20 minutes of exposure to heat.

EXAMPLE 6

The procedure of Example 5 was followed to prepare four formulations except that the amount of butylstannoic acid used as the co-stabilizer with thiolauric anhydride was varied between 0 and 7½ weight percent based on the thiolauric anhydride. Each formulation contained 2.0 parts thiolauric anhydride and the following table reports the results of the above test for each formulation.

TABLE VI

| Formulation | Amount of butyl stannoic acid in part per 100 | Time in minutes to slight discoloration |
|---|---|---|
| 1 | 0 | (¹) |
| 2 | 0.05 | 20 |
| 3 | 0.1 | 30 |
| 4 | 0.15 | 20 |

¹ Developed slight yellow color during milling.

EXAMPLE 7

Six formulations were prepared according to the procedure of Example 6 except that monobutyltin tris[cyclo- hexylidene bis (thiopropionic acid) monobutyl ester] was substituted for the butyl stannoic acid in Example 6 and tests were extended to formulations containing up to 20 percent of the monobutyltin tris [cyclohexylidene bis(thiopropionic acid) monobutyl ester]. The results of this test are reported in Table VII and formulation 1 is not according to the present invention but included for comparison purposes only.

TABLE VII

| Formulation | Amount of co-stabilizer in part per 100 | Time to first discolorization |
|---|---|---|
| 1 | 0 | (¹) |
| 2 | 0.05 | 30 |
| 3 | 0.1 | 30 |
| 4 | 0.15 | 30 |
| 5 | 0.2 | 20 |
| 6 | 0.3 | 20 |

¹ Slight yellowing developed during milling.

EXAMPLE 8

Four formulations of 100 parts PVC 40, 25 parts dioctyl phthalate, 5 parts epoxidized soy bean oil, 0.25 parts of stearic acid, 1.9 parts thiolauric anhydride and 0.1 parts of the stabilizer as indicated in Table VIII were processed according to the procedure of Example 1. The results of the test are reported in Table VIII.

TABLE VIII

| Formulation | Stabilizer composition | First color | Serious degradation |
|---|---|---|---|
| 1 | Butyl stannoic acid | 40 | 90 |
| 2 | Dioctyl tin bis(isooctyl thioglycolate) | 10 | 80 |
| 3 | Dioctyl tin maleate | 10 | 80 |
| 4 | Bis tributyl tin oxide | 0 | 50 |

The test of Example 8 clearly demonstrates that only monohydrocarbyl tin compounds produce the synergistic results obtained by the stabilizers of the present invention.

What I claim is:

1. A stabilizing composition for halogen-containing resins selected from the group consisting of polyvinyl chloride, polyvinylidene chloride and copolymers thereof with other ethylenically unsaturated monomers comprising a synergistic composition of (1) a thioanhydride corresponding to the formula

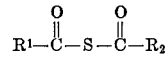

wherein $R^1$ and $R^2$ are hydrocarbyl radicals containing 6 to 20 carbons and about 2.5 to about 15 weight percent or (2) a monohydrocarbyltin compound selected from the group consisting of stannoic acids having monohydrocarbyl radicals selected from the group consisting of alkyl, aryl, alkaryl and aralkyl radicals having 1 to 12 carbon atoms and butyltin tris.

2. A stabilizer according to claim 1 wherein said thioanhydride is selected from the group consisting of thiolauric anhydride, thiostearic anhydride and thiobenzoic anhydride.

3. A stabilizer according to claim 2 wherein said monohydrocarbyl tin compound is selected from the group consisting of butyl stannoic acid, monobutyl tin tris methyl stannoic acid and phenyl stannoic acid and said compound is present in an amount from about 4 to about 12 weight percent.

4. A composition comprising a halogen-containing polymer selected from the group consisting of polyvinyl chloride, polyvinylidene chloride and copolymers thereof with other ethylenically unsaturated monomers stabilized with 0.1 to 10 percent by weight of said polymer of the composition of claim 3.

References Cited

UNITED STATES PATENTS

| | | | |
|---|---|---|---|
| 2,746,946 | 5/1956 | Weinberg | 260—45.75 |
| 2,789,963 | 4/1957 | Hecker | 260—45.75 |
| 3,021,302 | 2/1962 | Frey | 260—45.75 |
| 3,413,264 | 11/1968 | Hechenbleikner | 260—45.75 |
| 3,461,091 | 8/1969 | Stamm | 260—45.85 |

OTHER REFERENCES

Chemistry and Industry, periodical dated Feb. 16, 1963, pp. 271 and 279 of article entitled "Antioxidants" by Scott.

The Stabilization of Polyvinyl Chloride by Chevassus, 1963 edition, pp. 166, 167 and 168. St. Martin's Press, Inc., New York.

DONALD E. CZAJA, Primary Examiner

V. P. HOKE, Assistant Examiner

U.S. Cl. X.R.

252—406— 260—45.7 R

UNITED STATES PATENT OFFICE
CERTIFICATE OF CORRECTION

Patent No. 3,630,993                    Dated December 28, 1971

Inventor(s) Christian H. Stapfer

It is certified that error appears in the above-identified patent and that said Letters Patent are hereby corrected as shown below:

In claim 1, line 58, "or" should read --of--, and in line 62, "tris." should read --tris[cyclohexylidene-1, 1-bis (mercaptopropionate) monobutyl ester].--;

In claim 3, line 70, "monobutyl tin tris" should read --monobutyl tin tris[cyclohexylidene bis (thiopropionic acid) monobutyl ester],--.

Signed and sealed this 18th day of December 1973.

(SEAL)
Attest:

EDWARD M. FLETCHER, JR.              RENE D. TEGTMEYER
Attesting Officer                     Acting Commissioner of Patents